(12) United States Patent
Stewart et al.

(10) Patent No.: US 9,341,088 B2
(45) Date of Patent: May 17, 2016

(54) CAMSHAFT PHASER CONTROL SYSTEMS AND METHODS

(75) Inventors: Etsuko Muraji Stewart, Laingsburg, MI (US); Joseph J. Moon, Clawson, MI (US); Darrell W. Burleigh, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 696 days.

(21) Appl. No.: 13/432,538

(22) Filed: Mar. 28, 2012

(65) Prior Publication Data

US 2013/0261929 A1    Oct. 3, 2013

(51) Int. Cl.
| | |
|---|---|
| *F01L 1/34* | (2006.01) |
| *F01L 1/344* | (2006.01) |
| *F02D 13/02* | (2006.01) |
| *F01L 1/352* | (2006.01) |

(52) U.S. Cl.
CPC . *F01L 1/344* (2013.01); *F01L 1/34* (2013.01); *F02D 13/0219* (2013.01); *F01L 2001/3522* (2013.01); *F01L 2800/00* (2013.01); *F01L 2800/01* (2013.01); *F01L 2800/03* (2013.01)

(58) Field of Classification Search
CPC ............................... F02D 41/04; F02D 41/221
USPC ......... 123/179.3, 179.4, 179.14–179.18, 319, 123/321, 322, 325, 345–348, 350, 478, 480, 123/90.11, 90.15–90.18; 701/102, 110, 112
See application file for complete search history.

(56) References Cited

U.S. PATENT DOCUMENTS

| | | | | |
|---|---|---|---|---|
| 5,979,378 A * | 11/1999 | Matsuno et al. | ............ | 123/90.15 |
| 6,257,184 B1 * | 7/2001 | Yamagishi et al. | ......... | 123/90.15 |
| 6,330,869 B1 * | 12/2001 | Yoshiki et al. | ............ | 123/90.15 |
| 6,885,976 B2 * | 4/2005 | Yoshiki et al. | ................ | 702/185 |
| 6,915,767 B2 * | 7/2005 | Pfeiffer et al. | ............. | 123/90.15 |
| 8,346,447 B2 * | 1/2013 | Baur et al. | ...................... | 701/54 |

(Continued)

FOREIGN PATENT DOCUMENTS

| | | | | |
|---|---|---|---|---|
| CN | 101109328 A | | 1/2008 | |
| JP | 2005248905 A * | | 9/2005 | ............. F02D 13/02 |

(Continued)

OTHER PUBLICATIONS

U.S. Appl. No. 13/161,862, filed Jun. 16, 2011, Stewart et al.

(Continued)

*Primary Examiner* — Thomas Moulis
*Assistant Examiner* — Joseph Dallo

(57) ABSTRACT

A control system for a vehicle includes a motor driver module, a correlation triggering module, a target phase angle module, and a correlation control module. The motor driver module controls an electric camshaft phaser of an engine based on a desired phase angle between a position of a crankshaft and a position of a camshaft. The correlation triggering module selectively generates a signal based on the position of the camshaft. The target phase angle module adjusts the desired phase angle to a predetermined phase angle in response to the generation of the signal. The correlation control module, in response to the generation of the signal: determines the position of the crankshaft when the camshaft is in a predetermined position; and selectively outputs a fault indicator based on a comparison of the position of the crankshaft and a predetermined crankshaft position range corresponding to the predetermined position.

20 Claims, 8 Drawing Sheets

(56) References Cited

U.S. PATENT DOCUMENTS

| | | | |
|---|---|---|---|
| 8,473,179 B2* | 6/2013 | Whitney et al. | 701/102 |
| 8,495,981 B2 | 7/2013 | Stewart et al. | |
| 8,726,880 B2* | 5/2014 | Stewart | F02D 13/00 123/325 |
| 2002/0189563 A1* | 12/2002 | Muraki et al. | 123/90.18 |
| 2004/0231624 A1* | 11/2004 | Shindou et al. | 123/90.15 |
| 2005/0217620 A1* | 10/2005 | Shindou | 123/90.15 |
| 2006/0081203 A1* | 4/2006 | Izumi et al. | 123/90.17 |
| 2007/0169731 A1* | 7/2007 | Farah et al. | 123/90.17 |
| 2007/0221151 A1* | 9/2007 | Kadowaki | 123/90.17 |
| 2008/0011254 A1* | 1/2008 | Matsushima et al. | 123/90.17 |
| 2008/0017149 A1* | 1/2008 | Kokubo et al. | 123/90.16 |
| 2008/0022953 A1* | 1/2008 | Kanada et al. | 123/90.17 |
| 2008/0065308 A1* | 3/2008 | Tanaka et al. | 701/102 |
| 2008/0081702 A1* | 4/2008 | Tanaka et al. | 464/1 |
| 2009/0020085 A1* | 1/2009 | Hattori | 123/90.17 |
| 2009/0020086 A1* | 1/2009 | Hattori | 123/90.17 |
| 2009/0058344 A1* | 3/2009 | Morino | 318/599 |
| 2011/0011360 A1* | 1/2011 | Wada | 123/90.17 |
| 2012/0318223 A1* | 12/2012 | Stewart | F02D 13/00 123/90.17 |

FOREIGN PATENT DOCUMENTS

| | | | |
|---|---|---|---|
| JP | 2009046995 A | * | 3/2009 |
| JP | 2009074379 A | * | 4/2009 |

OTHER PUBLICATIONS

U.S. Appl. No. 13/074,446, filed Mar. 29, 2011, Stewart et al.

* cited by examiner

FIG. 4

CAMSHAFT PHASER CONTROL SYSTEMS AND METHODS

CROSS-REFERENCE TO RELATED APPLICATIONS

This application is related to U.S. patent application Ser. No. 13/161,862, filed on Jun. 16, 2011, and U.S. patent application Ser. No. 13/074,446 filed on Mar. 29, 2011. The disclosures of the above applications are incorporated herein by reference in their entirety.

FIELD

The present disclosure relates to control systems and methods for engines and more particularly to camshaft phaser control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an internal combustion engine that combusts an air/fuel mixture within cylinders to produce drive torque. The engine may include pistons that reciprocate within the cylinders and that are coupled to a crankshaft. The pistons drive rotation of the crankshaft. The engine may also include a valve train that controls airflow into and out of the cylinders. The valve train may include one or more camshafts that selectively open and close intake valves and exhaust valves of the cylinders.

The camshaft(s) rotate with the crankshaft and control the timing of the opening and closing of the intake and exhaust valves relative to a position of the crankshaft. The valve train may further include one or more cam phasers coupled to the camshaft(s) and the crankshaft. The cam phaser(s) may adjust the rotational position of the camshaft(s) with respect to the position of the crankshaft.

SUMMARY

A control system for a vehicle includes a motor driver module, a correlation triggering module, a target phase angle module, and a correlation control module. The motor driver module controls an electric camshaft phaser of an engine based on a desired phase angle between a position of a crankshaft and a position of a camshaft. The correlation triggering module selectively generates a signal based on the position of the camshaft. The target phase angle module adjusts the desired phase angle to a predetermined phase angle in response to the generation of the signal. The correlation control module, in response to the generation of the signal: determines the position of the crankshaft when the camshaft is in a predetermined position; and selectively outputs a fault indicator based on a comparison of the position of the crankshaft and a predetermined crankshaft position range corresponding to the predetermined position.

A control method for a vehicle includes: controlling an electric camshaft phaser of an engine based on a desired phase angle between a position of a crankshaft and a position of a camshaft; and selectively generating a signal based on the position of the camshaft; adjusting the desired phase angle to a predetermined phase angle in response to the generation of the signal. The control method further includes, in response to the generation of the signal: determining the position of the crankshaft when the camshaft is in a predetermined position; and selectively outputting a fault indicator based on a comparison of the position of the crankshaft and a predetermined crankshaft position range corresponding to the predetermined position.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram of an example correlation control module according to the present disclosure;

DETAILED DESCRIPTION

Figure 1:
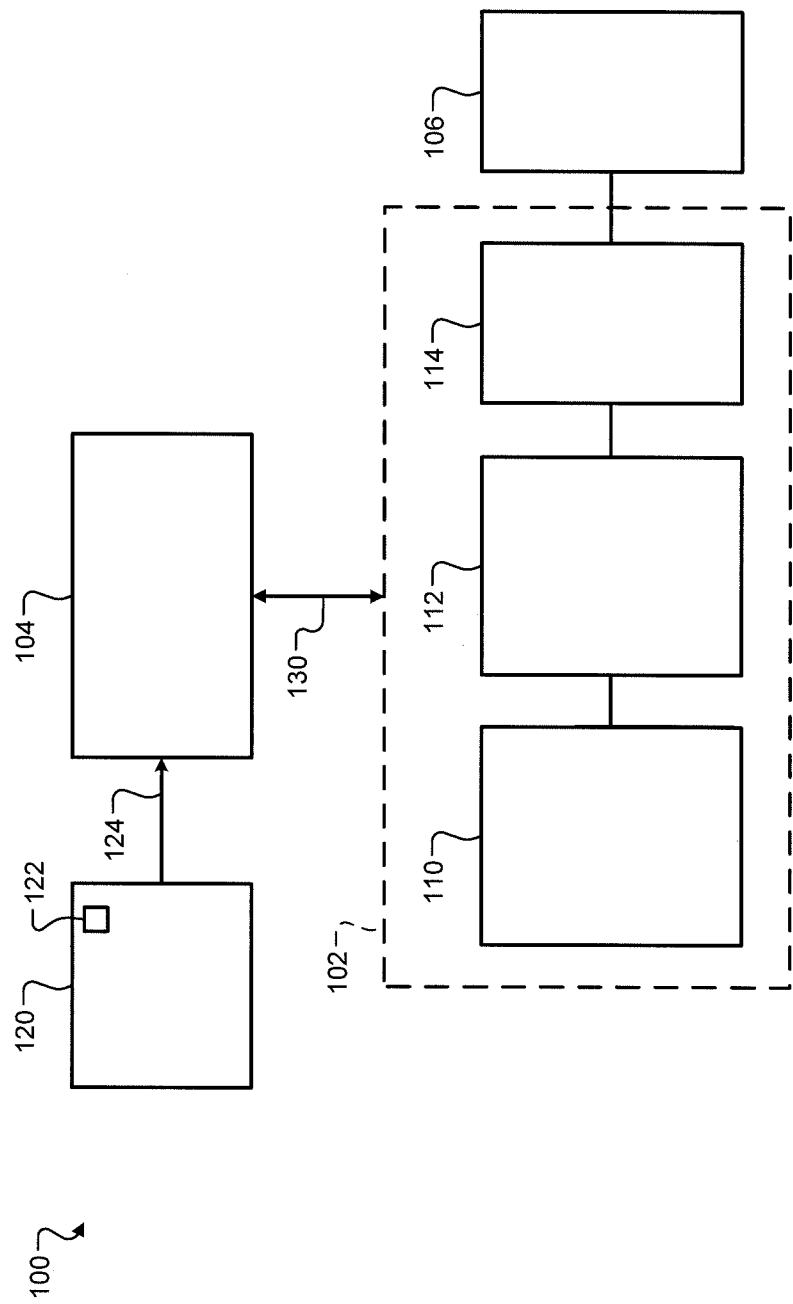
FIG. 1 is a functional block diagram of an example vehicle system according to the present disclosure.

Cam phasers are typically hydraulically actuated using oil pressurized by, for example, an oil pump driven by the engine. Pressurized oil may not be available under some circumstances, such as when the engine is not running. A biasing member (e.g., one or more springs) may bias a cam phaser against a mechanical end-stop and in a default position (e.g., fully retarded or fully advanced) when pressurized oil is not available. Hydraulically actuated cam phasers may also include a locking mechanism. As the engine starts to shut down and a hydraulically actuated cam phaser moves toward the park default position, the locking mechanism engages and prevents angular rotation between the camshaft and the crankshaft. Therefore, a hydraulically actuated cam phaser will be parked in the default position when the engine is started. A hydraulically actuated cam phaser may remain in the default position after the engine is started until sufficient oil pressure is available to adjust the position of the cam phaser to a desired position.

Electrically-actuated cam phasers, however, do not rely on the availability of pressurized oil for actuation. Like hydraulic cam phasers, electric cam phasers can be positioned at the default position after the engine is shut down and left there until the engine is started. Unlike hydraulic cam phasers, electric cam phasers can be positioned and left at positions other than the default position for a subsequent startup of the engine.

An engine control module monitors the position of the crankshaft and the position of the camshaft. The engine control module samples the crankshaft position when the camshaft position reaches predetermined positions. The engine control module selectively compares the sampled crankshaft positions with predetermined ranges of crankshaft positions associated with the predetermined camshaft positions, respectively. When the crankshaft and the camshaft have been installed correctly and the camshaft and crankshaft position sensors are accurate, and a component (e.g., belt or chain) that drives the camshaft has not jumped one or more teeth, the crankshaft positions should be within the predetermined ranges, respectively.

The engine control module may compare the crankshaft positions with the predetermined ranges, respectively. The engine control module may take one or more remedial actions (e.g., setting a diagnostic trouble code or DTC, triggering a malfunction indicator lamp, disabling cam phasing, altering one or more engine operating parameters, etc.) when one or more of the crankshaft positions are not within the predetermined ranges, respectively. In other words, the engine control module may take one or more remedial actions when the crankshaft and camshaft positions do not correlate.

In engine systems with a hydraulic cam phaser, the engine control module may determine whether the crankshaft positions are within the predetermined ranges during a predetermined period after the engine is started. The hydraulic cam phaser is in the default position during the predetermined period after the engine is started. In engine systems with an electric cam phaser, however, the cam phaser can be positioned in positions other than the default position when the engine is started. The position of an electric cam phaser can be set at shutdown of the engine, for example, to optimize engine operation when the engine is started.

The engine control module may wait to perform the comparisons of the crankshaft positions with the predetermined ranges until, for example, a deceleration fuel cutoff (DFCO) event is performed. However, the component that drives the camshaft may jump one or more teeth, for example, during shutdown of an engine, during startup of the engine, or during engine operation before a DFCO event is performed. The engine control module of the present disclosure may therefore selectively trigger performance of the comparisons based on camshaft positions before a DFCO event is performed.

Referring now to FIG. 1, a functional block diagram of an example vehicle system 100 is presented. The vehicle system 100 includes a powertrain 102 controlled by a powertrain control module 104. The powertrain 102 produces drive torque used to drive one or more wheels 106 of the vehicle. The powertrain 102 includes an engine system 110, a transmission 112, and a driveline 114.

The engine system 110 produces drive torque that is transmitted to the wheels 106 via the transmission 112 and the driveline 114. The present disclosure is not limited to transmissions or drivelines of a particular type. For example only, the transmission 112 may be an automatic transmission, a manual transmission, an automated manual transmission, or another suitable type of transmission.

The powertrain control module 104 controls operation of the powertrain 102 based on various driver inputs, vehicle operating conditions, and other vehicle system signals. The driver inputs may be received by driver interface modules 120 that generate driver signals in response to the driver inputs.

The driver interface modules 120 may include an ignition switch or button 122 that can be manipulated by the driver to start and shut down the vehicle. The ignition switch 122 may have multiple positions, for example, an OFF position, an ON position, and a CRANK position. The ignition switch 122 may output an ignition signal 124 indicative of the ignition switch position.

The driver interface modules 120 may further include, for example, an accelerator pedal (not shown) and a brake pedal (not shown) that can be manipulated by the driver. An accelerator pedal position signal and a brake pedal position signal may be generated based on the positions of the accelerator pedal and the brake pedal, respectively. The driver interface modules 120 may further include a cruise control system (not shown).

Various vehicle operating conditions and parameters are measured by sensors and/or determined as discussed in further detail below. The vehicle system signals include the driver signals and other signals 130 generated by the various components of the vehicle system 100.

Figure 2:
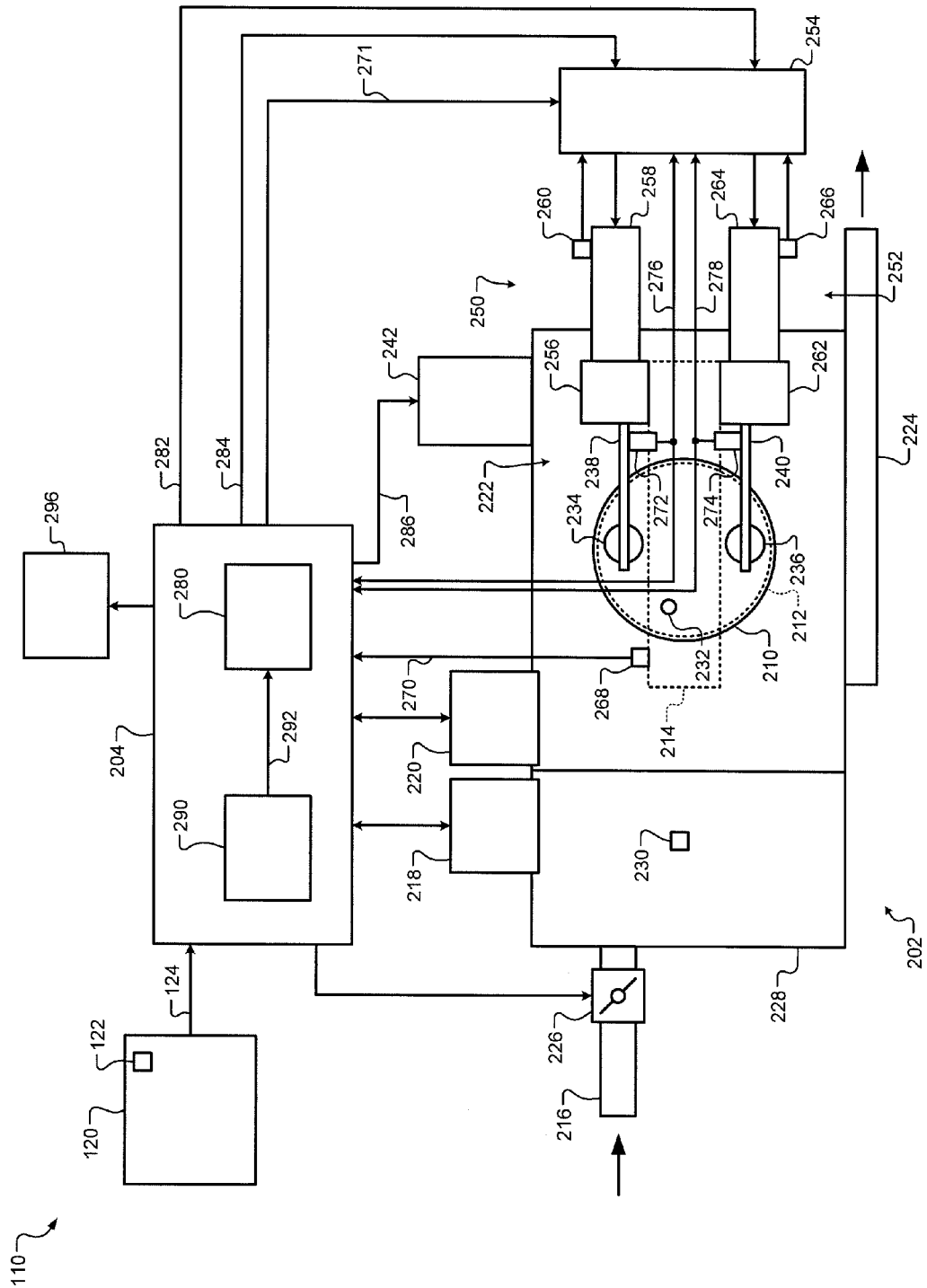
FIG. 2 is a functional block diagram of an example engine system according to the present disclosure.

Referring now to FIG. 2, a functional block diagram of an example implementation of the engine system 110 is presented. Generally, the engine system 110 includes an internal combustion engine (ICE) 202 that is controlled by an engine control module (ECM) 204 based on various driver inputs, engine operating conditions, and other vehicle system signals.

The ICE 202 produces drive torque by combusting an air/fuel mixture and may be one of several types. For example only, the ICE 202 may be a spark-ignition (SI) engine or a compression-ignition (CI) engine. The ICE 202 combusts the air/fuel mixture within a cylinder 210 of the engine. The ICE 202 is presented as a single cylinder engine for simplicity, but the ICE 202 can include more than one cylinder. A piston 212 reciprocates within the cylinder 210 between a top-dead-center (TDC) position and a bottom-dead-center (BDC) position. Combustion of the air/fuel mixture drives the piston 212, and the piston 212 drives rotation of a crankshaft 214.

The ICE 202 includes an intake system 216, a fuel system 218, an ignition system 220, a valve train 222, and an exhaust system 224. The intake system 216 controls air flow into the ICE 202. The intake system 216 may include a throttle 226 that controls airflow into an intake manifold 228. The throttle 226 may include a butterfly valve having a rotatable blade or another suitable type of throttle. Air is drawn into the cylinder 210 from the intake manifold 228.

The fuel system 218 supplies fuel to the ICE 202 and may include a fuel tank assembly (not shown) that contains the fuel and one or more fuel injectors that control an amount of the fuel supplied. In various implementations, such as central point injection and multi-point injection implementations, one or more fuel injectors may inject fuel into the intake system 216 upstream of the cylinder 210. In direct-injection implementations, one or more fuel injectors may inject fuel directly into the cylinder 210. For example purposes only, a single fuel injector 230 is shown that injects fuel into the intake system 216 upstream of the cylinder 210.

The ignition system 220 may supply energy for initiating combustion within the cylinder 210 in the form of a spark supplied by a spark plug 232 extending into the cylinder 210. In some types of engines, such as CI engines, the spark plug 232 may be omitted.

The valve train 222 includes at least one intake valve and one exhaust valve that are actuated by at least one camshaft. The valve train 222 may have one of several configurations, such as an overhead camshaft configuration or a cam-in-block configuration. For example only, the valve train 222 presented has an overhead camshaft configuration including an intake valve 234 and an exhaust valve 236 actuated by an intake camshaft 238 and an exhaust camshaft 240, respectively.

In an open position, the intake valve 234 allows air and fuel to enter the cylinder 210 via the intake system 216. In a closed position, the intake valve 234 closes the cylinder 210 to the intake system 216. In an open position, the exhaust valve 236 allows combustion gases to exit the cylinder 210 to the exhaust system 224. In a closed position, the exhaust valve 236 closes the cylinder 210 to the exhaust system 224. In various implementations, multiple intake valves and/or exhaust valves may be provided for each cylinder of the ICE 202.

The intake camshaft 238 and the exhaust camshaft 240 are coupled to and rotate with the crankshaft 214. The intake camshaft 238 and the exhaust camshaft 240 may be coupled to the crankshaft 214 via a chain or belt. In this manner, rotation of the intake camshaft 238 and the exhaust camshaft 240 are synchronized with rotation of the crankshaft 214.

The intake camshaft 238 controls the opening and closing of the intake valve 234 (i.e., intake valve timing). The intake camshaft 238 includes a cam lobe (not shown) that is associated with the intake valve 234. The cam lobe engages the intake valve 234 to control the opening and closing of the intake valve 234. In various implementations, the intake camshaft 238 may include one or more additional cam lobe (not shown) associated with the intake valve 234 having a different profile (for different lift and/or timing). Other types of variable valve lift systems may be used.

A valve lift actuator module 242 may control the variable valve lift system. More specifically, the valve lift actuator module 242 controls the intake valve lift. For example only, the valve lift actuator module 242 may control the intake valve lift between low lift operation and high lift operation. The intake valve 234 may open to a maximum amount during high lift operation and open to a minimum amount during low lift operation. The valve lift actuator module 242 may also control the intake valve lift to one or more additional intake valve lift states between high and low lift operation.

The exhaust camshaft 240 controls the opening and closing of the exhaust valve 236. The exhaust camshaft 240 also includes one or more cam lobes (not shown). The cam lobe(s) engage(s) the exhaust valve 236 to control the opening and closing of the exhaust valve 236. As the first and second camshafts 238, 240 rotate, the lobes of the intake and exhaust camshafts 238 and 240 displace the intake and exhaust valves 234 and 236, respectively, between the open and closed positions.

The valve train 222 also includes a cam phaser system that selectively adjusts intake and/or exhaust valve timing by controlling phase angles between the crankshaft 214 and the intake and exhaust camshafts 238 and 240. An example cam phaser system presented includes an intake phaser 250, an exhaust phaser 252, and a motor driver module 254.

The intake phaser 250 controls the intake valve timing by selectively adjusting the position of the intake camshaft 238 relative to the position of the crankshaft 214. The rotational position of the intake camshaft 238 relative to the position of the crankshaft 214 may be referred to as intake phase angle.

The intake phaser 250 may include a gear train 256, an electric motor 258, and a position sensor 260. In various implementations, the position sensor 260 may be omitted. The gear train 256 includes a drive gear (not shown) in a meshed arrangement with a driven gear (not shown). The drive gear is coupled to the crankshaft 214, and the driven gear is coupled to the intake camshaft 238. In various arrangements, one or more intermediate gears may be interposed between the drive gear and the driven gear. Mechanical stops (not shown) may be built into the gear train 256. The electric motor 258 is drivingly coupled to the gear train 256.

The mechanical stops may prevent the electric motor 258 from advancing or retarding the intake camshaft 238 such that the intake phase angle would exceed a fully advanced angle or a fully retarded angle. In this manner, the mechanical stops establish what may be referred to as a phasing range or a phasing authority. The gear train 256 and the electric motor 258 may work together to maintain an intake phase angle. The position sensor 260 senses a rotational position of the electric motor 258 and outputs a signal indicative of the rotational position sensed.

The exhaust phaser 252 may control the exhaust valve timing by selectively adjusting the position of the exhaust camshaft 240 relative to the crankshaft position. The position of the exhaust camshaft 240 relative to the position of the crankshaft 214 may be referred to as exhaust phase angle. The exhaust phaser 252 may be structurally and functionally similar to the intake phaser 250. The exhaust phaser 252 may include a gear train 262, an electric motor 264, and a position sensor 266 substantially similar to the gear train 256, the electric motor 258, and the position sensor 260 discussed above. Again, in various implementations, the position sensor 266 may be omitted.

The motor driver module 254 controls the intake phase angle and the exhaust phase angle via the electric motors 258 and 264 based on various inputs. The inputs include various control values received from the ECM 204, including a desired intake phase angle 282 and a desired exhaust phase angle 284. The motor driver module 254 adjusts the intake and exhaust phase angles via the electric motors 258 and 264, respectively, to achieve the desired intake and exhaust phase angles 282 and 284. The motor driver module 254 may determine present values of the intake and exhaust phase angles to determine how to operate the electric motors 258 and 264 to achieve the desired intake and exhaust phase angles 282 and 284. In various implementations, the motor driver module 254 may be integrated within the ECM 204.

A crankshaft position sensor 268 may sense a rotational position of the crankshaft 214 and generate a crankshaft position signal (CPS) 270 based on the crankshaft rotational position sensed. For example only, the CPS may include a train of pulses where the crankshaft position sensor 268 generates a pulse in the pulse train as a tooth of a first toothed wheel that rotates with the crankshaft 214 passes the crankshaft position sensor 268. The ECM 204 may determine the crankshaft position 271 by counting the pulses in the CPS 270. The crankshaft position 271 may correspond to the present position of the crankshaft 214.

Camshaft position sensors 272 and 274 may sense rotational positions of the intake and exhaust camshafts 238 and 240, respectively. The camshaft position sensors 272 and 274 output camshaft position signals 276 and 278 indicative of the intake and exhaust camshaft rotational positions sensed, respectively.

Intake camshaft position 279 can be determined by counting the pulses in the camshaft position signal 276. Exhaust camshaft position (not specifically shown or numbered) can be determined by counting pulses in the camshaft position signal 278. The intake camshaft position 279 and the exhaust cam position may correspond to the present positions of the intake and exhaust camshafts 238 and 240. For example only, the intake camshaft position 279 and the exhaust camshaft position may be determined independently by each of the ECM 204 and the motor driver module 254. In various implementations, the intake camshaft position 279 and the exhaust camshaft position may be determined by one of the ECM 204 and the motor driver module 254 and provided to the other one of the ECM 204 and the motor driver module 254.

Present values of the intake and exhaust phase angles can be determined based on the crankshaft position 271 and the intake camshaft position 279 and the exhaust camshaft position, respectively. When making adjustments, the motor driver module 254 may control operation of the electric motors 258 and 264 additionally or alternatively based on the outputs of the position sensors 260 and 266. The intake and exhaust phasers 250 and 252 may therefore be adjusted to achieve the desired intake and exhaust phase angles 282 and 284 at the appropriate time.

The ECM 204 controls operation of the ICE 202 and engine torque output. The ECM 204 may control the engine torque output by controlling various engine operating parameters including mass air flowrate (MAF), a manifold pressure, the air/fuel mixture, spark timing, valve timing, valve lift, and one or more suitable engine operating parameters.

For example only, the ECM 204 may include a valve control module 280 (see also FIG. 3) that generates the desired intake phase angle 282, the desired exhaust phase angle 284, and a desired valve lift 286. The motor driver module 254 may control the electric motors 258 and 264 based on the desired intake and exhaust phase angles 282 and 284, respectively. The valve lift actuator module 242 may control intake valve lift based on the desired valve lift 286.

The ECM 204 may also include a deceleration fuel cutoff (DFCO) module 290 that controls the performance of DFCO events. Provision of fuel to the ICE 202 is disabled during a DFCO event. Disabling the provision of fuel to the ICE 202 may be performed to, for example, increase fuel economy. While the provision of fuel is disabled during a DFCO event, the ICE 202 continues to pump air through the ICE 202. Drawing air into the ICE 202, compressing air within the cylinder(s) of the ICE 202, and expelling air from the ICE 202 may apply a braking (i.e., negative) torque on the crankshaft 214. In other words, torque losses attributable to engine pumping (i.e., pumping losses) occur during a DFCO event.

The DFCO module 290 may generate a DFCO signal 292 for a DFCO event. For example only, the DFCO module 290 may set the DFCO signal 292 to an active state to initiate a DFCO event when one or more DFCO enabling conditions are satisfied and maintain the DFCO signal 292 in the active state until one or more DFCO disabling conditions are satisfied. The DFCO module 290 may transition the DFCO signal 292 to an inactive state and end the DFCO event when the one or more DFCO disabling conditions are satisfied.

The valve control module 280 may receive the DFCO signal 292. When a DFCO event is initiated, the valve control module 280 transitions the desired intake phase angle 282 to a predetermined phase angle, such as the fully advanced angle, the fully retarded angle, or another suitable phase angle. While the principles of the present disclosure may also be applicable to the exhaust camshaft 240, for purposes of discussion only, the present disclosure will be described in conjunction with the intake camshaft 238 and the desired intake phase angle 282.

When the desired intake phase angle 282 is at or transitioning to the predetermined phase angle, the valve control module 280 samples the crankshaft position 271 when the intake camshaft position 279 reaches predetermined positions. The valve control module 280 diagnoses the presence of a fault based on whether the samples of the crankshaft position 271 are within the predetermined crankshaft position ranges, respectively. The presence of the fault may be attributable to, for example, the crankshaft 214 and/or the intake camshaft 238 being installed incorrectly within the ICE 202, inaccuracy in the crankshaft position sensor 268 and/or the intake camshaft position sensor 272, the component (e.g., chain or belt) that drives rotation of the intake camshaft 238 jumping a tooth, and/or one or more other possible causes. The ECM 204 may illuminate an indicator 296 (e.g., a malfunction indicator lamp or MIL), generate signal (e.g., a diagnostic trouble code), disable one or more other features or fault diagnostics, limit phasing of the intake camshaft 238, and/or take one or more other remedial actions based on the determination.

Figure 3:
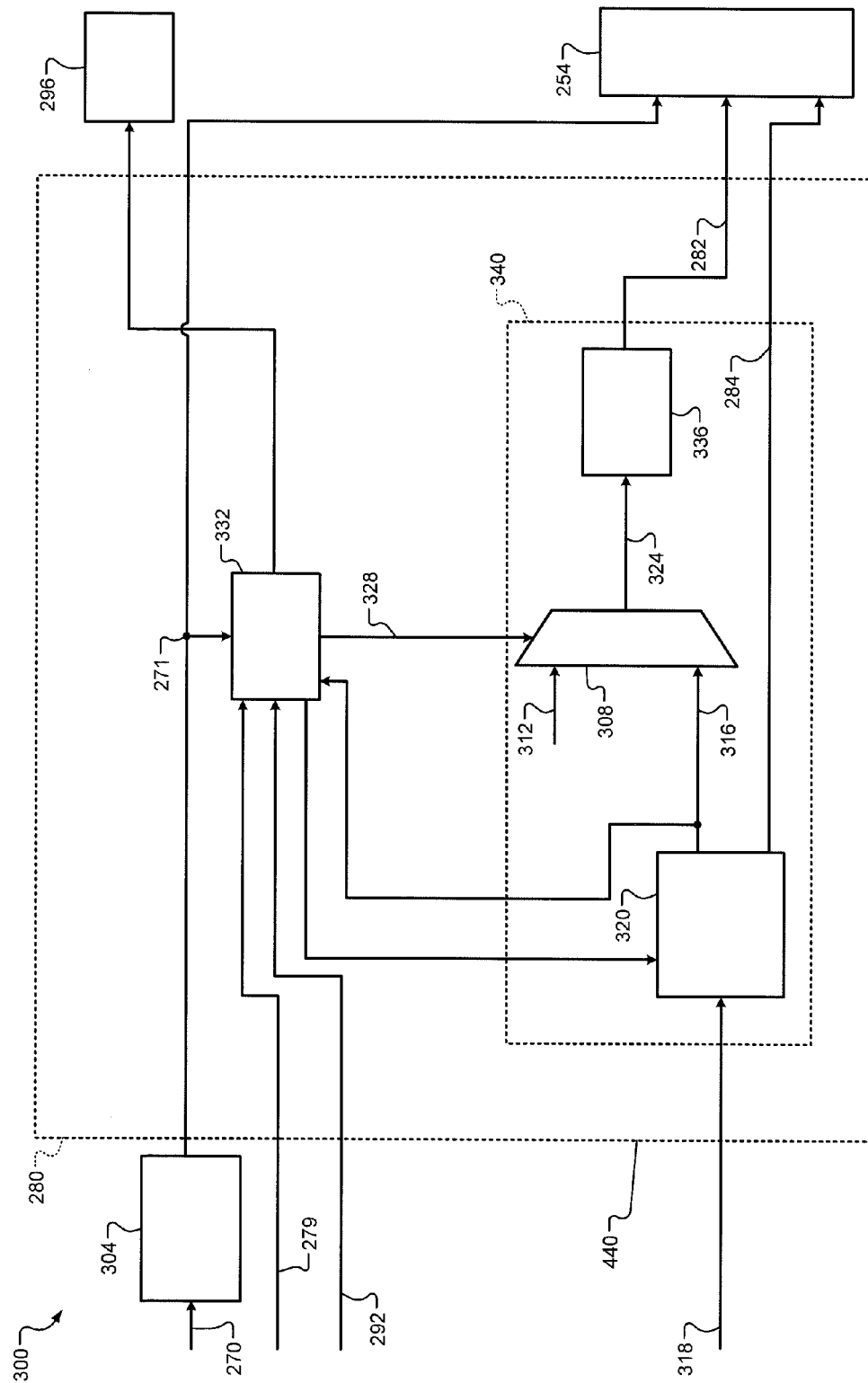
FIG. 3 is a functional block diagram of an example valve control system according to the present disclosure.

Referring now to FIG. 3, a functional block diagram of an example implementation of a valve control system 300 is presented. A crankshaft position determination module 304 may receive the CPS 270 from the crankshaft position sensor 268. The crankshaft position determination module 304 may determine the crankshaft position 271 based on the pulses in the CPS 270.

A first selection module 308 may receive a predetermined phase angle 312 and a commanded phase angle 316. The predetermined phase angle 312 and the commanded phase angle 316 may be used in setting the desired intake phase angle 282. The predetermined phase angle 312 is a predetermined value for the angle between the crankshaft position 271 and the intake camshaft position 279. The predetermined phase angle 312 may be calibrated and stored in memory (not shown). The predetermined phase angle 312 may correspond to the fully advanced angle, the fully retarded angle, or another suitable angle between the fully advanced and retarded angles.

A position command module 320 may determine and output the commanded phase angle 316. For example only, the position command module 320 may determine the commanded phase angle 316 based on driver inputs 318, such as the accelerator pedal position, the brake pedal position, and/or cruise control inputs. The position command module 320 may determine the commanded phase angle 316 additionally or alternatively based on one or more other suitable inputs.

The first selection module 308 outputs one of the predetermined phase angle 312 and the commanded phase angle 316 as a selected phase angle 324. The first selection module 308 selects which one of the predetermined phase angle 312 and the commanded phase angle 316 to output as the selected phase angle 324 based on a selection signal 328. For example only, the first selection module 308 may output the predetermined phase angle 312 as the selected phase angle 324 when the selection signal 328 is in a first state. The first selection module 308 may output the commanded phase angle 316 as the selected phase angle 324 when the selection signal 328 is in a second state.

A correlation control module 332 (see also FIG. 4) may generate the selection signal 328. The correlation control module 332 may selectively set the selection signal 328 to the first state when the DFCO signal 292 is in the active state. The correlation control module 332 may set the selection signal 328 to the second state when the DFCO signal 292 is in the inactive state. In this manner, the first selection module 308 may output the predetermined phase angle 312 as the selected phase angle 324 during a DFCO event. The first selection module 308 may output the commanded phase angle 316 as the selected phase angle 324 when a DFCO event is not occurring.

A rate limiter module 336 may receive the selected phase angle 324 and output the desired intake phase angle 282 based on the selected phase angle 324. For example only, the rate limiter module 336 may adjust the desired intake phase angle 282 toward the selected phase angle 324 at up to a predetermined rate. For example only, the predetermined rate may be approximately 50 crankshaft angle degrees (CAD) per second or another suitable rate.

In various implementations, the rate limiter module 336 may be omitted. In such implementations, the first selection module 308 may output the selected one of the predetermined phase angle 312 and the commanded phase angle 316 as the desired intake phase angle 282.

In other implementations, the first selection module 308 may also be omitted. In such implementations, the position command module 320 may adjust the commanded phase angle 316 toward the predetermined phase angle 312 at a predetermined rate or set the commanded phase angle 316 equal to the predetermined phase angle 312 in response to the selection signal 328 transitioning from the second state to the first state. A target phase angle module 340 may include the position command module 320, the first selection module 308, and/or the rate limiter module 336.

Referring again to the correlation control module 332, the correlation control module 332 may also selectively set the selection signal 328 to the second state when performance of a correlation event between the crankshaft position 271 and the intake camshaft position 279 is complete. The correlation control module 332 may initiate the performance of a correlation event in response to the DFCO signal 292 transitioning from the inactive state to the active state. The correlation control module 332 may additionally or alternatively initiate the performance of a correlation event when non-volatile memory (NVM) of the ECM 204 has been reset or re-flashed. While performance of the correlation event will be discussed in terms of being in response to performance of DFCO, the correlation control module 332 may initiate the performance of a correlation event when other suitable enabling conditions are satisfied. Performance of a correlation event is described further below in conjunction with FIG. 8.

The correlation control module 332 may perform the correlation event based on the intake camshaft position 279 and the crankshaft position 271. The correlation control module 332 may perform the correlation event based on values of the crankshaft position 271 taken when the intake camshaft position 279 reaches predetermined positions, respectively, during an engine cycle. In various engine systems, one engine cycle may refer to each of the cylinders of the engine undergoing one complete engine cycle. For example only, one engine cycle may refer to 720 degrees of rotation of the crankshaft 214 (i.e., 2 crankshaft revolutions). In this manner, one engine cycle may also refer to 360 degrees of rotation of the intake camshaft 238 (i.e., 1 camshaft rotation). The predetermined intake camshaft positions may be, for example, approximately every 90 degrees of camshaft rotation, as indicated by a tooth having a predetermined tooth profile passing the camshaft position sensor 272.

A predetermined crankshaft position range is associated with each of the predetermined intake camshaft positions for purposes of the correlation event. For example only, a predetermined crankshaft position range of 17 degrees to 37 degrees (i.e., 27 degrees +/−10 degrees) may be associated with a predetermined intake camshaft position of 0 degrees. In various implementations, the predetermined crankshaft range may not be symmetrical about a predetermined crankshaft position (e.g., +X degrees and −Y degrees, where X and Y are not equal).

The correlation control module 332 obtains the values of the crankshaft position 271 when the intake camshaft position 279 reaches the predetermined intake camshaft positions, respectively, during the correlation event. The correlation control module 332 compares the values of the crankshaft position 271 with the predetermined crankshaft position ranges associated with the predetermined intake camshaft positions, respectively.

The correlation control module 332 may determine whether the crankshaft position 271 and the intake camshaft position 279 correlate based on whether the values of the crankshaft position 271 are within the predetermined crankshaft position ranges, respectively. For example only, the correlation control module 332 may determine that the crankshaft position 271 and the intake camshaft position 279 do not correlate when one or more of the values of the crankshaft position 271 are not within the predetermined crankshaft position ranges, respectively. The crankshaft position 271 and the intake camshaft position 279 not correlating may indicate that the crankshaft 214 and/or the intake camshaft 238 is/are not properly installed within the ICE 202 or that the component that drives rotation of the intake camshaft 238 has slipped/jumped a tooth.

The correlation control module 332 may take one or more remedial actions when the crankshaft position 271 and the intake camshaft position 279 do not correlate. For example only, the correlation control module 332 may set the selection signal 328 to the first state, even after the DFCO signal 292 transitions to the inactive state. This maintains the desired intake phase angle 282 at the predetermined phase angle 312 even after the DFCO event ends. The correlation control module 332 may also trigger illumination of the indicator 296, set a code/flag in memory (e.g., a diagnostic trouble code) associated with a failed correlation event that indicates that the crankshaft position 271 and the intake camshaft position 279 do not correlate. The correlation control module 332 may additionally or alternatively take one or more other remedial actions.

When the values of the crankshaft position 271 are within the predetermined crankshaft position ranges, respectively, the correlation control module 332 may transition to the selection signal 328 to the second state. The correlation control module 332 may transition the selection signal 328 to the second state even before the DFCO signal 292 transitions to the inactive state. In this manner, the desired intake phase angle 282 can be adjusted to the commanded phase angle 316. When the values of the crankshaft position 271 are within the predetermined crankshaft position ranges, respectively, the correlation control module 332 may also command the position command module 320 to remove limitations imposed on the commanded phase angle 316.

Figure 4:
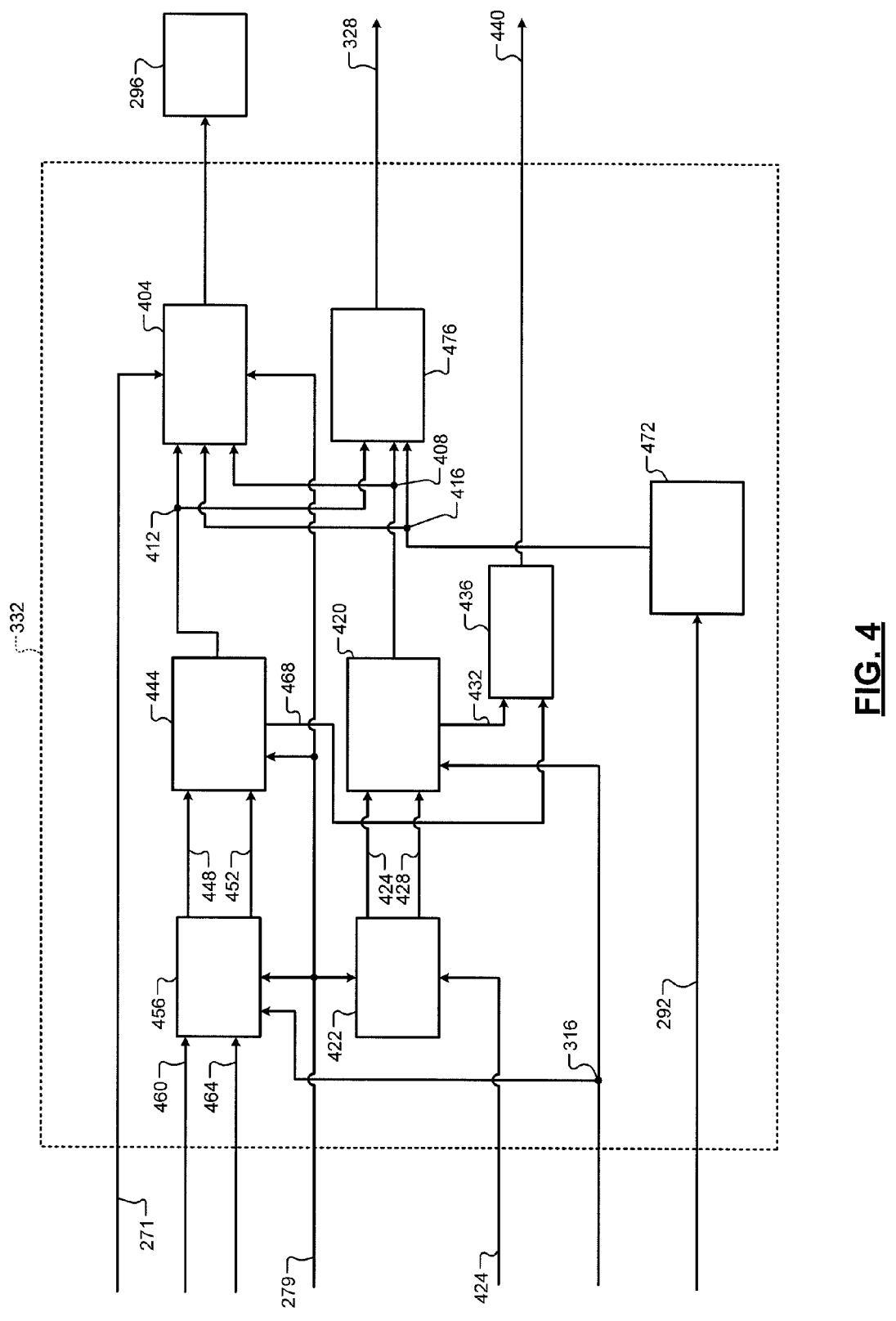

Referring now to FIG. 4, a functional block diagram of an example implementation of the correlation control module 332 is presented. A correlation determination module 404 selectively performs correlation events. The correlation determination module 404 performs correlation events based on the crankshaft position 271 and the intake camshaft position 279. The correlation determination module 404 may perform a correlation event in response to generation of at least one of a first correlation trigger (e.g., signal) 408, a second correlation trigger (e.g., signal) 412, and a third correlation trigger (e.g., signal) 416. Performance of a correlation event is described above and is described further below in conjunction with FIG. 8.

A first correlation triggering module 420 selectively generates the first correlation trigger 408. A position storage module 422 selectively sets a first intake camshaft position (X1) 424 equal to the intake camshaft position 279 in response to a user shutting down the ICE 202 via actuating the ignition switch 122. The user shutting down the ICE 202 via actuation of the ignition switch 122 may be indicated by the ignition signal 124. The position storage module 422 may continue to set the first intake camshaft position 424 equal to the intake camshaft position 279 until the ECM 204 is powered down after the shutting down of the ICE 202. The ECM 204 may be powered down, for example, a predetermined period after the shutting down of the ICE 202.

The position storage module 422 selectively sets a second intake camshaft position (X2) 428 equal to the intake camshaft position 279 in response to a user starting the ICE 202 via actuating the ignition switch 122. The user starting the ICE 202 via actuation of the ignition switch 122 may be indicated by the ignition signal 124. The position storage module 422 may set the second intake camshaft position 428 equal to a first valid value of the intake camshaft position 279 obtained after the initiation of the startup of the ICE 202. The intake camshaft position 279 may be deemed valid, for example, a predetermined period after the initiation of the startup of the ICE 202, when a predetermined number of values of the intake camshaft position 279 have been determined after the initiation of the startup of the ICE 202, or when one or more other suitable conditions are satisfied.

The first correlation triggering module 420 may selectively generate the first correlation trigger 408 based on the first and second intake camshaft positions 424 and 428. For example, when the first intake camshaft position 424 has not been lost between the shutdown of the ICE 202 and the following startup of the ICE 202, the first correlation triggering module 420 may refrain from generating the first correlation trigger 408 when both: (i) the first intake camshaft position 424 minus the second intake camshaft position 428 is less than a first predetermined value; and (ii) the second intake camshaft position 428 minus the first intake camshaft position 424 is less than a second predetermined value.

When condition (i) and/or condition (ii) is not satisfied, assembly of the ICE 202 may be incorrect or the component (e.g., chain or belt) that drives rotation of the intake camshaft 238 may have slipped/jumped by one tooth during the shutdown or the startup of the ICE 202. The first and second predetermined values may be the same value or different values. Different values may be used, for example, to account for different amounts of drift in the intake camshaft position 279 that may occur. For example only, the first and second values may be approximately 3-9 camshaft angle degrees or another suitable value that corresponds to the angle of rotation between two consecutive teeth of a toothed wheel (gear) that rotates with the intake camshaft 238.

Conversely, the first correlation triggering module 420 may refrain from generating the first correlation trigger 408 when both condition (i) and condition (ii) are satisfied. Refraining from generating the first correlation trigger 408 when conditions (i) and (ii) are satisfied may allow performance of a correlation event to be postponed, for example, until a DFCO event occurs. While postponing performance of a correlation event until a DFCO event occurs will be discussed, performance of a correlation event can be postponed until one or more other suitable conditions are satisfied.

Under some circumstances, the first intake camshaft position 424 may be lost between when the ICE 202 is shut down and when the ICE 202 is subsequently started. For example, if the first intake camshaft position 424 is stored in NVM, the first intake camshaft position 424 may be lost when the NVM is reset. The NVM may be reset, for example, when a battery is disconnected. While the first intake camshaft position 424 being lost will be discussed in conjunction with a reset of the NVM, the first intake camshaft position 424 may be stored in another different type of memory and/or may be lost under other circumstances.

When the first intake camshaft position 424 has been lost, the first correlation triggering module 420 may determine whether a comparison of the second intake camshaft position 428 with the commanded phase angle 316 should be performed. The commanded phase angle 316 determined shortly startup of the ICE 202 begins should be equal to the commanded phase angle 316 determined at the shutdown of the ICE 202. A state of a first indicator (e.g., flag) may indicate whether the comparison of the second intake camshaft position 428 with the commanded phase angle 316 should be performed.

When the comparison of the second intake camshaft position 428 with the commanded phase angle 316 should be performed, the first correlation triggering module 420 may determine whether both: (iii) the commanded phase angle 316 minus the second intake camshaft position 428 is less than a third predetermined value; and (iv) the second intake camshaft position 428 minus the commanded phase angle 316 is less than a fourth predetermined value. The third and fourth predetermined values may be less than the first and second predetermined values, respectively. The third and fourth predetermined values may be the same value or different values.

The first correlation triggering module 420 may refrain from generating the first correlation trigger 408 when both condition (iii) and condition (iv) are satisfied. Refraining from generating the first correlation trigger 408 when conditions (iii) and (iv) are satisfied may allow performance of a correlation event to be postponed until a DFCO event occurs.

When the comparison of the second intake camshaft position 428 with the commanded phase angle 316 should not be performed, condition (i) is not satisfied, condition (ii) is not satisfied, condition (iii) is not satisfied, and/or condition (iv) is not satisfied, the first correlation triggering module 420 may determine whether a correlation event should be performed at that time or whether performance of a correlation event can be postponed until a DFCO event occurs. A state of a second indicator (e.g., flag) may indicate whether a correlation event should be performed at that time or whether performance of a correlation event can be postponed.

The first correlation triggering module 420 generates the first correlation trigger 408 (e.g., transitions the first correlation trigger 408 to an active state) when a correlation event should be performed at that time. The first correlation triggering module 420 may refrain from generating the first correlation trigger 408 (e.g., maintain the first correlation trigger 408 in an inactive state) when performance of a correlation event can be postponed.

If performance of a correlation event can be postponed, the first correlation triggering module 420 may determine whether to limit the commanded phase angle 316 to prevent an intake valve from colliding with a piston. A state of a third indicator (e.g., flag) may indicate whether to limit the commanded phase angle 316. For example, in some ICEs, intake valve/piston collisions may not occur at any value of the commanded phase angle 316. Thus, in such ICEs, the commanded phase angle 316 may not be limited.

In various implementations, the first correlation triggering module 420 may determine whether to limit the commanded phase angle 316 based on the first and second intake camshaft positions 424 and 428 when the first intake camshaft position 424 has not been lost. For example only, the first correlation triggering module 420 may limit the commanded phase angle 316 when at least one of: (v) the first intake camshaft position 424 minus the second intake camshaft position 428 is greater than a fifth predetermined value; and (vi) the second intake camshaft position 428 minus the first intake camshaft position 424 is greater than a sixth predetermined value. The fifth and sixth predetermined values may be greater than the first and second predetermined values, respectively, and may be the same or different values. When the first intake camshaft position 424 has not been lost, the first correlation triggering module 420 may determine a limitation angle 432 (e.g., degrees from the predetermined phase angle 312) for the commanded phase angle 316 as a function of a difference between the first and second intake camshaft positions 424 and 428.

When the first intake camshaft position 424 has been lost and the comparison of the commanded phase angle 316 and the second intake camshaft position 428 has been performed, the first correlation triggering module 420 may determine whether to limit the commanded phase angle 316 based on the second intake camshaft position 428 and the commanded phase angle 316. For example only, the first correlation triggering module 420 may limit the commanded phase angle 316 when at least one of: (vii) the second intake camshaft position 428 minus the commanded phase angle 316 is greater than a seventh predetermined value; and (viii) the commanded phase angle 316 minus the second intake camshaft position 428 is greater than an eighth predetermined value. The seventh and eighth predetermined values may be greater than the third and fourth predetermined values, respectively, and may be the same or different values. When the first intake camshaft position 424 has been lost and the comparison of the commanded phase angle 316 and the second intake camshaft position 428 has been performed, the first correlation triggering module 420 may determine the limitation angle 432 for the commanded phase angle 316 as a function of a difference between the second intake camshaft position 428 and the commanded phase angle 316.

A limiting module 436 sets a limitation angle 440 equal to the limitation angle 432 and outputs the limitation angle 440 to the position command module 320. The position command module 320 limits the commanded phase angle 316 based on the limitation angle 440 and the predetermined phase angle 312. For example, the position command module 320 may limit the commanded phase angle 316 to within a range defined by the predetermined phase angle 312 at one end of the range and by an angle equal to the predetermined phase angle 312 plus or minus the limitation angle 440 at the other end of the range.

A second correlation triggering module 444 selectively generates the second correlation trigger 412. The second correlation triggering module 444 selectively generates the second correlation trigger 412 based on the intake camshaft position 279 while the ICE 202 is running. The second correlation triggering module 444 selectively generates the second correlation trigger 412 further based on a predicted value of the intake camshaft position 279 at a given time ("predicted intake camshaft position 448") and a predicted range for a difference between the intake camshaft position 279 and the predicted intake camshaft position 448 at the given time ("predicted range 452").

A predicting module 456 generates the predicted intake camshaft position 448 and the predicted range 452. The predicting module 456 determines the predicted intake camshaft position 448 as a function of the commanded phase angle 316 at the given time, the intake camshaft position 279, a phasing speed 460, and a phasing acceleration 464. The predicting module 456 determines the predicted range 452 as a function of the commanded phase angle 316 at the given time, the intake camshaft position 279, the phasing speed 460, and the phasing acceleration 464.

A difference between the intake camshaft position 279 and the predicted intake camshaft position 448 that is greater than the predicted range 452 may indicate that the component (e.g., belt or chain) that drives rotation of the intake camshaft 238 has jumped one or more teeth. The phasing speed 460 may be generated, for example, based on a derivative of the intake camshaft position 279. The phasing acceleration 464 may be generated, for example, based on a second derivative of the intake camshaft position 279.

If (ix) the intake camshaft position 279 minus the predicted intake camshaft position 448 is less than the predicted range 452 and/or (x) predicted intake camshaft position 448 minus the intake camshaft position 279 is less than the predicted range 452, the second correlation triggering module 444 may refrain from generating the second correlation trigger 412. In various implementations, different values for the predicted range 452 may be used in determining whether conditions (ix) and (x) are satisfied. Refraining from generating the second correlation trigger 412 when at least one of conditions (ix) and (x) are satisfied may allow performance of a correlation event to be postponed until a DFCO event occurs.

When both condition (ix) and condition (x) are not satisfied, the second correlation triggering module 444 may determine whether a correlation event should be performed at that time or whether performance of a correlation event can be postponed until a DFCO event occurs. A state of a fourth indicator (e.g., flag) may indicate whether a correlation event should be performed at that time or whether performance of a correlation event can be postponed.

The second correlation triggering module 444 generates the second correlation trigger 412 (e.g., transitions the second correlation trigger 412 to an active state) when a correlation event should be performed at that time. The second correlation triggering module 444 may refrain from generating the second correlation trigger 412 (e.g., maintain the second correlation trigger 412 in an inactive state) when performance of a correlation event can be postponed.

If performance of a correlation event can be postponed, the second correlation triggering module 444 may determine whether to limit the commanded phase angle 316. The second correlation triggering module 444 may determine whether to limit the commanded phase angle 316 to prevent an intake valve from colliding with a piston.

The second correlation triggering module 444 may determine whether to limit the commanded phase angle 316, for example, based on a state of a fifth indicator (e.g., flag) or based on a difference between the intake camshaft position 279 and the predicted intake camshaft position 448. The second correlation triggering module 444 may determine to limit the commanded phase angle 316 when at least one of: (xi) the intake camshaft position 279 minus the predicted intake camshaft position 448 is greater than an eleventh predetermined value; and (xii) the predicted intake camshaft position 448 minus the intake camshaft position 279 is greater than a twelfth predetermined value. The eleventh and twelfth predetermined values are greater than the predicted range 452 and may be the same or different values.

The second correlation triggering module 444 may determine a limitation angle 468 (e.g., degrees from the predetermined phase angle 312) for the commanded phase angle 316 as a function of a difference between the predicted intake camshaft position 448 and the intake camshaft position 279.

The limiting module 436 sets the limitation angle 440 equal to the limitation angle 468 and outputs the limitation angle 440 to the position command module 320. The position command module 320 limits the commanded phase angle 316 based on the limitation angle 440 and the predetermined phase angle 312.

A third correlation triggering module 472 selectively generates the third correlation trigger 416 while the ICE 202 is running. The third correlation triggering module 472 generates the third correlation trigger 416 when fuel is cutoff to the ICE 202 for a DFCO event.

A selection generating module 476 transitions the selection signal 328 to the first state in response to the generation of at least one of the first correlation trigger 408, the second correlation trigger 412, and the third correlation trigger 416. The desired intake phase angle 282 is then adjusted to the predetermined phase angle 312 and the intake camshaft 238 is moved to the predetermined phase angle 312. As discussed above, the correlation determination module 404 performs a correlation event in response to the generation of at least one of the first correlation trigger 408, the second correlation trigger 412, and the third correlation trigger 416.

Figure 5:
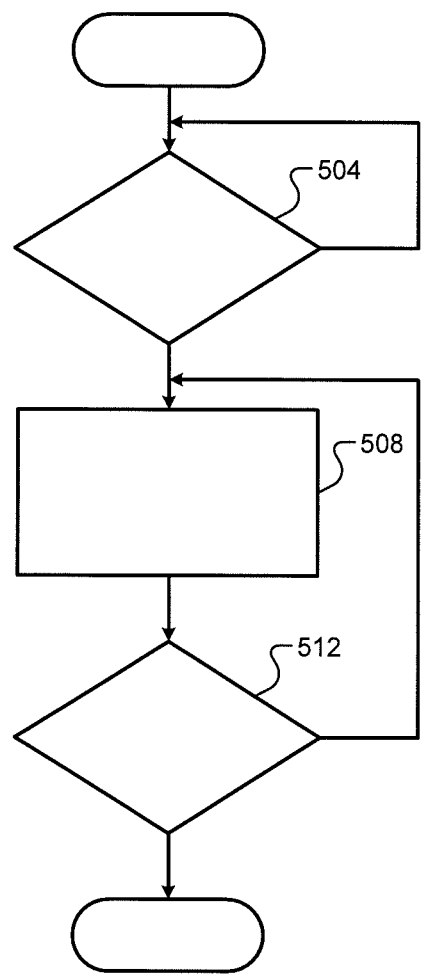
FIG. 5 is a flowchart depicting an example method of setting a first intake camshaft position for determining whether to trigger performance of a correlation event after an engine startup according to the present disclosure.

Referring now to FIG. 5, a flowchart depicting an example method of setting the first intake camshaft position 424 for determining whether to trigger performance of a correlation event after an engine startup is presented. Control may begin with 504 where control determines whether a user has actuated the ignition switch 122 to shut down the vehicle (e.g., turned an ignition key to the OFF position). If true, control continues with 508; if false, control may remain at 504. The ICE 202 is shut down in response to actuation of the ignition switch 122 to shut down the vehicle.

At 508, control sets the first intake camshaft position (X1) 424 equal to the intake camshaft position 279. Control continues with 512. Control determines whether the ECM 204 is still awake (i.e., not yet powered down) at 512. If true, control returns to 508 and updates the first intake camshaft position 424 to the intake camshaft position 279. If false, control may end. The ECM 204 may be powered down, for example, a predetermined period after the shutting down of the ICE 202.

Figure 6:
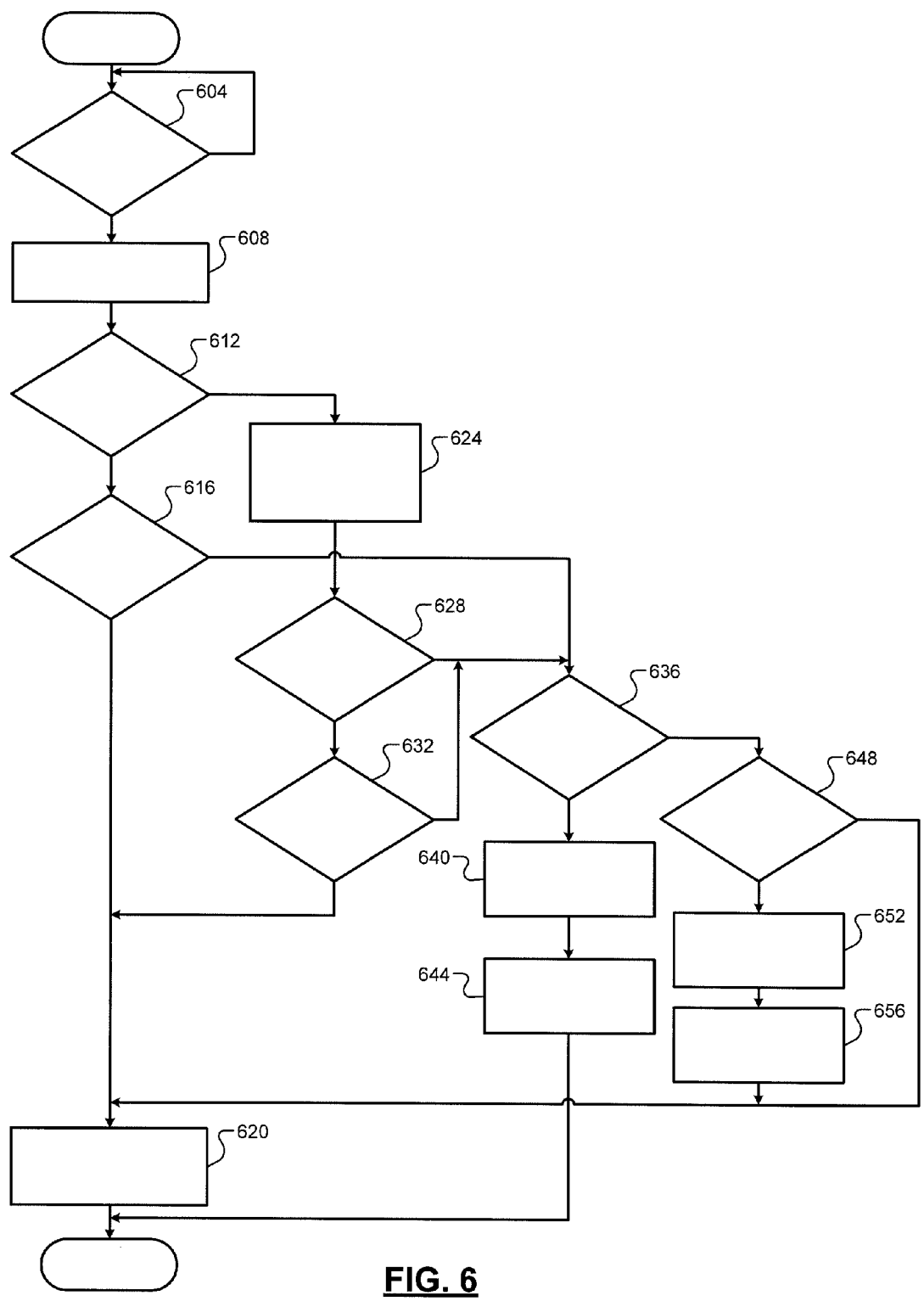
FIG. 6 is a flowchart depicting an example method of setting a second intake camshaft position and determining whether to trigger performance of a correlation event after the engine startup according to the present disclosure.

Referring now to FIG. 6, a flowchart depicting an example method of determining whether to initiate a correlation event is presented. Control may begin with 604 where control determines whether a user has actuated the ignition switch 122 to start the ICE 202 (e.g., turned an ignition key to the CRANK or ON position). If true, control continues with 608; if false, control may remain at 604.

At 608, control sets the second intake camshaft position (X2) 428 equal to the first valid value of the intake camshaft position 279. The intake camshaft position 279 may be deemed valid, for example, a predetermined period after the initiation of the startup of the ICE 202, when a predetermined number of values of the intake camshaft position 279 have been determined after the initiation of the startup of the ICE 202, or when one or more other suitable conditions are satisfied.

At 612, control determines whether the first intake camshaft position 424 has been lost since the ICE 202 was last shut down. For example, control may determine whether the NVM was reset at 612. If false, control continues with 616. If true, control continues with 624, which is discussed further below.

At 616, control determines whether the (i) the first intake camshaft position 424 minus the second intake camshaft position 428 is less than the first predetermined value (Z1) and (ii) the second intake camshaft position 428 minus the first intake camshaft position 424 is less than the second predetermined value (Z2). If both are true, control may refrain from generating the first correlation trigger 408 at 620, and control may end. In this manner, control may postpone performance of a correlation event, for example, until a DFCO event is performed. If one or more of conditions (i) and (ii) are false, control may continue with 636, which is discussed further below.

At 624 (i.e., when the first intake camshaft position 424 has not been lost since the ICE 202 was last shut down), control determines the commanded phase angle 316. At this time, the commanded phase angle 316 should be approximately equal to what the first intake camshaft position 424 would be. Control continues with 628.

Control determines whether to compare the commanded phase angle 316 with the second intake camshaft position 428 at 628. If true, control may continue with 632. If false, control continues with 636, which is discussed further below. Control may determine whether to perform the comparison based on the state of the first indicator.

At 632, control determines whether (iii) the commanded phase angle 316 minus the second intake camshaft position 428 is less than the third predetermined value (Z3); and (iv) the second intake camshaft position 428 minus the commanded phase angle 316 is less than the fourth predetermined value (Z4). If both are true, control may refrain from generating the first correlation trigger 408 at 620, and control may end. In this manner, control may postpone performance of a correlation event, for example, until a DFCO event is performed. If one or more of conditions (iii) and (iv) are false, control may continue with 636, which is discussed further below.

At 636 (i.e., when the comparison of the second intake camshaft position 428 with the commanded phase angle 316 should not be performed, condition (i) is not satisfied, condition (ii) is not satisfied, condition (iii) is not satisfied, and/or condition (iv) is not satisfied), control determines whether a correlation event should be performed at that time or whether performance of a correlation event can be postponed until a DFCO event is performed. Control may determine whether a correlation event should be performed at that time based on the state of the second indicator. If a correlation event should be performed at that time, control adjusts the desired intake phase angle 282 to the predetermined phase angle 312 at 640 and performs the correlation event at 644. Control may then end. If performance of a correlation event can be postponed, control continues with 648.

Control determines whether to limit the commanded phase angle 316 at 648. If false, control may refrain from generating the first correlation trigger 408 at 620, and control may end. If true, control may continue with 652. Control may determine whether to limit the commanded phase angle 316, for example, based on the state of the third indicator. For another example, control may determine whether to limit the commanded phase angle 316 based on the first and second intake camshaft positions 424 and 428 when the first intake camshaft position 424 has not been lost. Control may limit the commanded phase angle 316 when at least one of: (v) the first intake camshaft position 424 minus the second intake camshaft position 428 is greater than the fifth predetermined value; and (vi) the second intake camshaft position 428 minus the first intake camshaft position 424 is greater than the sixth predetermined value.

For another example, when the first intake camshaft position 424 has not been lost and the comparison of the commanded phase angle 316 and the second intake camshaft position 428 has been performed, control may determine whether to limit the commanded phase angle 316 based on the second intake camshaft position 428 and the commanded phase angle 316. Control may limit the commanded phase angle 316 when at least one of: (vii) the second intake camshaft position 428 minus the commanded phase angle 316 is greater than the seventh predetermined value; and (viii) the commanded phase angle 316 minus the second intake camshaft position 428 is greater than the eighth predetermined value.

Control determines the limitation angle 432 for the commanded phase angle 316 at 652. For example, when the first intake camshaft position 424 has not been lost, control may determine the limitation angle 432 as a function of a difference between the first and second intake camshaft positions 424 and 428. For another example, when the first intake camshaft position 424 has been lost and the comparison of the commanded phase angle 316 and the second intake camshaft position 428 has been performed, control may determine the limitation angle 432 for the commanded phase angle 316 as a function of a difference between the second intake camshaft position 428 and the commanded phase angle 316. Control limits the possible range for setting the commanded phase angle 316 based on the limitation angle 432 at 656, and control refrains from generating the first correlation trigger 408 at 620. Control may then end.

Figure 7:
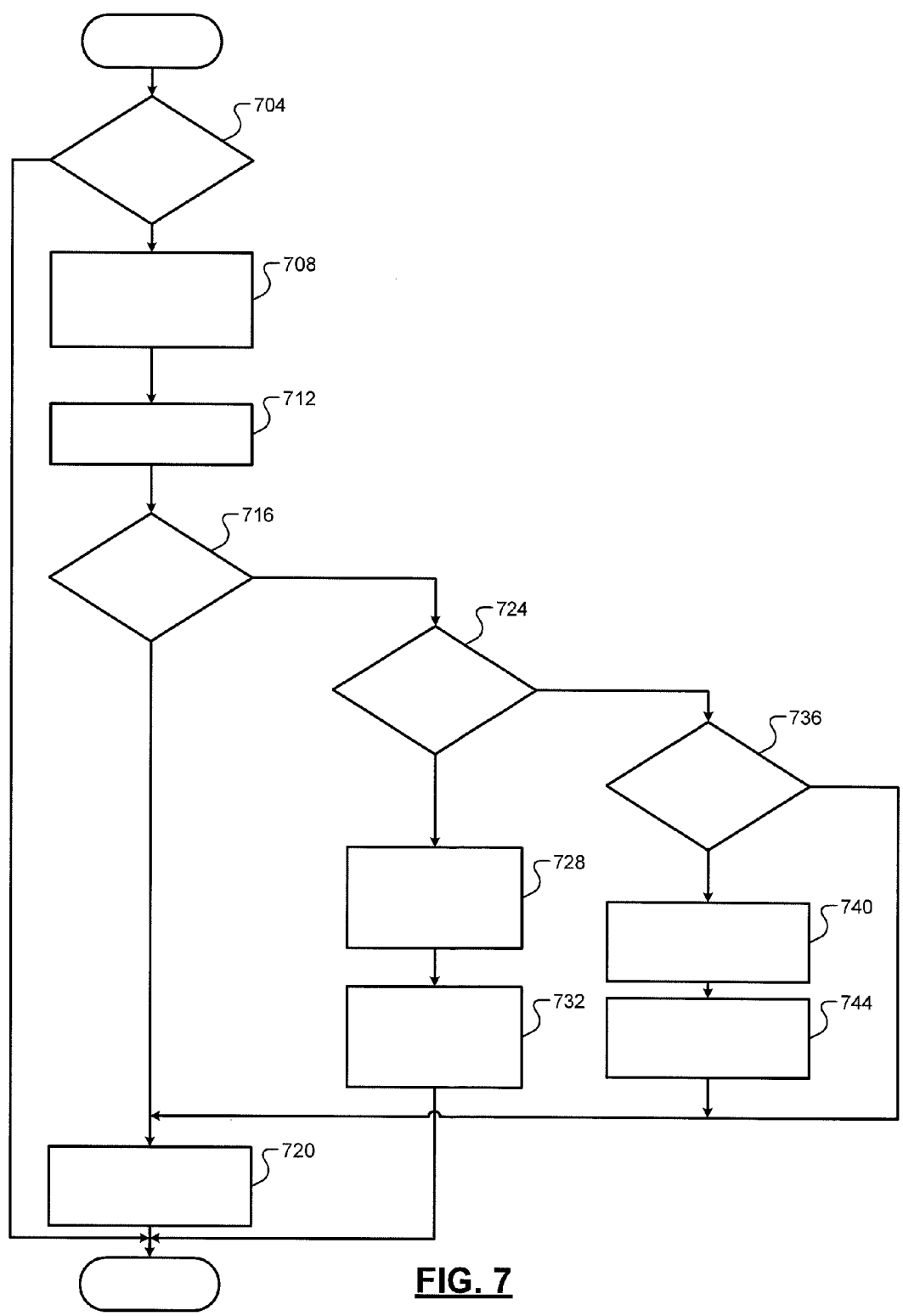
FIG. 7 is a flowchart depicting an example method of determining whether to trigger performance of a correlation event while an engine is running according to the present disclosure.

Referring now to FIG. 7, a flowchart depicting an example method of generating the second correlation trigger 412 is presented. Control may begin with 704 where control may determine whether the ICE 202 is running. If true, control may continue with 708. If false, control may end. The ICE 202 may be deemed running, for example, when an engine speed is greater than a predetermined speed (e.g., an idle speed) after a startup of the ICE 202.

At 708, control determines the predicted intake camshaft position 448 and the predicted range 752. Control determines the predicted intake camshaft position 448 and the predicted range 752 as functions of the phasing speed 460, the phasing acceleration 464, the intake camshaft position 279, and the commanded phase angle 316. At 712, control updates the intake camshaft position 279.

At 716, control determines whether (ix) the intake camshaft position 279 minus the predicted intake camshaft position 448 is less than the predicted range 452 and/or (x) predicted intake camshaft position 448 minus the intake camshaft position 279 is less than the predicted range 452. If true, control may refrain from generating the second correlation trigger 412 at 720, and control may end. In this manner, control may postpone performance of a correlation event, for example, until a DFCO event is performed. If condition (ix) and (x) are both false, control may continue with 724.

At 724, control determines whether a correlation event should be performed at that time or whether performance of a correlation event can be postponed until a DFCO event is performed. Control may determine whether a correlation event should be performed at that time based on the state of the fourth indicator. If a correlation event should be performed at that time, control adjusts the desired intake phase angle 282 to the predetermined phase angle 312 at 728 and performs the correlation event at 732. Control may then end. If performance of a correlation event can be postponed, control continues with 736.

Control determines whether to limit the commanded phase angle 316 at 736. If false, control may refrain from generating the first correlation trigger 408 at 720, and control may end. If true, control may continue with 740. For example, control may determine whether to limit the commanded phase angle 316, for example, based on the state of the fifth indicator. For another example, control may determine whether to limit the commanded phase angle 316 based on a difference between the intake camshaft position 279 and the predicted intake camshaft position 448. Control may limit the commanded phase angle 316 when: (xi) the intake camshaft position 279 minus the predicted intake camshaft position 448 is greater than the eleventh predetermined value; and/or (xii) the predicted intake camshaft position 448 minus the intake camshaft position 279 is greater than the twelfth predetermined value, where the eleventh and twelfth predetermined values are greater than the predicted range 452.

Control determines the limitation angle 468 for the commanded phase angle 316 at 740. For example, control may determine the limitation angle 468 as a function of a difference between the intake camshaft position 279 and the predicted intake camshaft position 448. Control limits the possible range for setting the commanded phase angle 316 based on the limitation angle 468 at 744, and control refrains from generating the first correlation trigger 408 at 720. Control may then end. While control is shown and discussed as ending, FIG. 7 may be illustrative of one control loop and control may continue to execute control loops while the ICE 202 is running.

Figure 8:
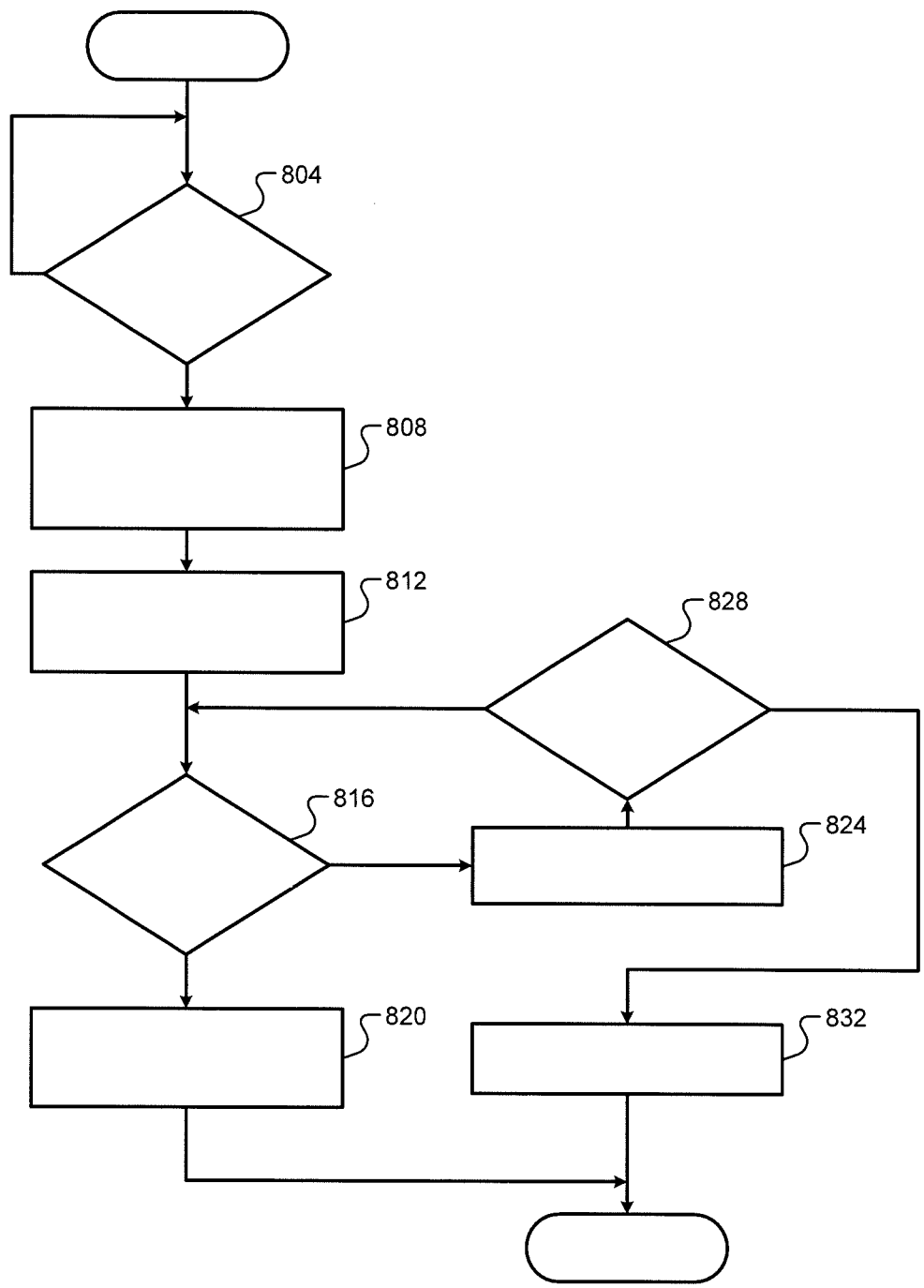
FIG. 8 is a flowchart depicting an example method of performing a correlation event according to the present disclosure.

Referring now to FIG. 8, a flowchart depicting an example method of performing a correlation event is presented. Control may begin with 804 where control determines whether to perform a correlation event. If true, control continues with 808. If false, control may remain at 804. Control may perform a correlation event, for example, in response to generation of at least one of the first and second correlation triggers 408 and 412. Control may additionally or alternatively perform a correlation event in response to generation of the third correlation trigger 416. The third correlation trigger 416 may be generated in response to cutting off fuel to the ICE 202 for a DFCO event or when one or more other suitable conditions are satisfied for initiating performance of a correlation event.

At 808, control controls the intake phaser 250 based on the predetermined phase angle 312. For example only, control may transition the desired intake phase angle 282 to the predetermined phase angle 312 and control the intake phaser 250 to achieve the desired intake phase angle 282. Control may rate limit the transition of the desired intake phase angle 282 to the predetermined phase angle 312. Prior to transitioning the desired intake phase angle 282 to the predetermined phase angle 312, control may set the desired intake phase angle 282 based on the commanded phase angle 316.

At 812, control initiates performance of a correlation event. During the correlation event, control determines the values of the crankshaft position 271 when the intake camshaft position 279 reaches the predetermined camshaft positions, respectively. Control compares the values of the crankshaft position 271 with predetermined crankshaft position ranges associated with the predetermined camshaft positions, respectively.

Control determines whether the crankshaft position 271 correlates with the intake camshaft position 279 at 816. More specifically, control may determine whether the crankshaft position 271 is within a predetermined crankshaft position range associated with the intake camshaft position 279 being in one of the predetermined camshaft positions at 816. If true, control may control the intake phaser 250 based on the commanded phase angle 316 at 820 and control may end. If the commanded phase angle 316 has been limited, control may also remove the limitation at 820. If false, control may transfer to 824. One or more of the values of the crankshaft position 271 not being within the predetermined crankshaft position ranges, respectively, may indicate that the crankshaft 214 and/or the intake camshaft 238 is improperly installed or that the component (e.g., chain or belt) that drives rotation of the intake camshaft 238 has jumped one or more teeth.

At 824, when the crankshaft position 271 is not within the predetermined crankshaft position range associated with the one of the predetermined crankshaft positions, control may increment a counter value. The counter value may therefore track the number of times (e.g., engine cycles) that control has determined that the crankshaft position 271 does not correlate with the intake camshaft position 279.

Control may determine whether the counter value is greater than a predetermined value at 828. If false, control may return to 816. If true, control may take one or more remedial actions at 832 and control may end until a next time that the driver actuates the button, key, etc. to start the vehicle. For example only, the predetermined value may be approximately 3. The remedial actions may include, for example, illuminating the indicator 296, setting the DTC, maintaining control of the intake phaser 250 based on the predetermined phase angle 312, and/or one or more other suitable remedial actions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A control system for a vehicle, comprising:
   a motor driver module that controls an electric camshaft phaser of an engine based on a desired phase angle between a position of a crankshaft and a position of a camshaft;
   a correlation triggering module that selectively generates a signal based on the position of the camshaft;
   a target phase angle module that adjusts the desired phase angle to a predetermined phase angle in response to the generation of the signal; and
   a correlation control module that, in response to the generation of the signal:
      determines the position of the crankshaft when the camshaft is in a predetermined position; and
      selectively outputs a fault indicator based on a comparison of the position of the crankshaft and a predetermined crankshaft position range corresponding to the predetermined position.

2. The control system of claim 1 further comprising a position storage module that stores a first value of the position of the camshaft in response to a shutdown of the engine and that stores a second value of the position of the camshaft in response to a startup of the engine,
   wherein the correlation triggering module selectively generates the signal based on the first and second values.

3. The control system of claim 2 wherein the correlation triggering module generates the signal when a difference between the first and second values is greater than a predetermined angle.

4. The control system of claim 3 wherein, when the difference is less than the predetermined angle, the correlation triggering module determines a limitation angle for the electric camshaft phaser based on the difference, and
   wherein the target angle module limits the desired phase angle to a range defined by the predetermined phase angle and a phase angle determined as a function of the predetermined phase angle and the limitation angle.

5. The control system of claim 1 further comprising a position storage module that stores a first value of the position of the camshaft in response to a shutdown of the engine and that stores a second value of the position of the camshaft in response to a startup of the engine,
   wherein the target phase angle module determines a commanded phase angle after the startup of the engine, and
   wherein the correlation triggering module generates the signal when a difference between the commanded phase angle and the second value of the position is greater than a predetermined angle.

6. The control system of claim 1 further comprising:
   a predicting module that generates a predicted position of the camshaft and a predicted range for a difference between the position of the camshaft and the predicted position of the camshaft; and
   a second correlation triggering module that selectively generates a second signal based on the predicted range and the difference between the position and the predicted position,
   wherein, in response to generation of the second signal, the correlation control module determines the crankshaft position and selectively outputs the fault indicator based on the comparison.

7. The control system of claim 6 wherein the second correlation triggering module generates the second signal when the difference is greater than a predetermined angle.

8. The control system of claim 7 wherein, when the difference is less than the predetermined angle, the second correlation triggering module determines a limitation angle for the electric camshaft phaser based on the difference, and
  wherein the target angle module limits the desired phase angle to a range defined by the predetermined phase angle and a phase angle determined as a function of the predetermined phase angle and the limitation angle.

9. The control system of claim 7 wherein the predicting module generates the predicted position and the predicted range based on phasing speed, phasing acceleration, a commanded phase angle, and the position of the camshaft.

10. The control system of claim 6 further comprising a third correlation triggering module that generates a third signal when fuel is cutoff from the engine for a deceleration fuel cutoff (DFCO) event,
  wherein, in response to generation of the third signal, the correlation control module determines the crankshaft position and selectively outputs the fault indicator based on the comparison.

11. A control method for a vehicle, comprising:
  controlling an electric camshaft phaser of an engine based on a desired phase angle between a position of a crankshaft and a position of a camshaft;
  selectively generating a signal based on the position of the camshaft;
  adjusting the desired phase angle to a predetermined phase angle in response to the generation of the signal; and
  in response to the generation of the signal:
    determining the position of the crankshaft when the camshaft is in a predetermined position; and
    selectively outputting a fault indicator based on a comparison of the position of the crankshaft and a predetermined crankshaft position range corresponding to the predetermined position.

12. The control method of claim 11 further comprising:
  storing a first value of the position of the camshaft in response to a shutdown of the engine;
  storing a second value of the position of the camshaft in response to a startup of the engine; and
  selectively generating the signal based on the first and second values.

13. The control method of claim 12 further comprising generating the signal when a difference between the first and second values is greater than a predetermined angle.

14. The control method of claim 13 further comprising:
  when the difference is less than the predetermined angle, determining a limitation angle for the electric camshaft phaser based on the difference; and
  limiting the desired phase angle to a range defined by the predetermined phase angle and a phase angle determined as a function of the predetermined phase angle and the limitation angle.

15. The control method of claim 11 further comprising:
  storing a first value of the position of the camshaft in response to a shutdown of the engine;
  storing a second value of the position of the camshaft in response to a startup of the engine;
  determining a commanded phase angle after the startup of the engine; and
  generating the signal when a difference between the commanded phase angle and the second value of the position is greater than a predetermined angle.

16. The control method of claim 11 further comprising:
  generating a predicted position of the camshaft and a predicted range for a difference between the position of the camshaft and the predicted position of the camshaft;
  selectively generating a second signal based on the predicted range and the difference between the position and the predicted position; and,
  in response to generation of the second signal, determining the crankshaft position and selectively outputting the fault indicator based on the comparison.

17. The control method of claim 16 further comprising generating the second signal when the difference is greater than a predetermined angle.

18. The control method of claim 17 further comprising:
  when the difference is less than the predetermined angle, determining a limitation angle for the electric camshaft phaser based on the difference; and
  limiting the desired phase angle to a range defined by the predetermined phase angle and a phase angle determined as a function of the predetermined phase angle and the limitation angle.

19. The control method of claim 17 further comprising generating the predicted position and the predicted range based on phasing speed, phasing acceleration, a commanded phase angle, and the position of the camshaft.

20. The control method of claim 16 further comprising:
  generating a third signal when fuel is cutoff from the engine for a deceleration fuel cutoff (DFCO) event; and,
  in response to generation of the third signal, determining the crankshaft position and selectively outputting the fault indicator based on the comparison.

* * * * *